US011177045B2

(12) United States Patent
Kimura et al.

(10) Patent No.: US 11,177,045 B2
(45) Date of Patent: Nov. 16, 2021

(54) THERMAL-NEUTRON REACTOR CORE AND DESIGN METHOD FOR THERMAL-NEUTRON REACTOR CORE

(71) Applicants: Kabushiki Kaisha Toshiba, Minato-ku (JP); Toshiba Energy Systems & Solutions Corporation, Kawasaki (JP)

(72) Inventors: Rei Kimura, Setagaya (JP); Satoshi Wada, Kawasaki (JP); Haruka Kajiwara, Arakawa (JP); Ryosuke Miura, Yokohama (JP)

(73) Assignees: Kabushiki Kaisha Toshiba, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 493 days.

(21) Appl. No.: 15/921,891

(22) Filed: Mar. 15, 2018

(65) Prior Publication Data
US 2018/0268948 A1  Sep. 20, 2018

(30) Foreign Application Priority Data

Mar. 15, 2017 (JP) .............................. JP2017-049738

(51) Int. Cl.
G21C 1/32 (2006.01)
G21C 3/326 (2006.01)
(Continued)

(52) U.S. Cl.
CPC .............. G21C 3/326 (2013.01); G21C 3/00 (2013.01); G21C 3/07 (2013.01); G21C 3/28 (2013.01);
(Continued)

(58) Field of Classification Search
CPC . G21C 3/00; G21C 3/07; G21C 3/326; G21C 3/28; G21C 5/02; G21C 7/04
See application file for complete search history.

(56) References Cited

U.S. PATENT DOCUMENTS 3,104,219 A * 9/1963 Sulzer .................... G21C 3/326
376/435
3,248,299 A * 4/1966 Junkermann ............ G21C 5/04
376/302

(Continued)

FOREIGN PATENT DOCUMENTS

DE 202007009376 U1 * 9/2007 ............. G21C 15/12
FR 2919954 A1 5/2008
(Continued)

OTHER PUBLICATIONS

Kimura, Rei, and Tadashi Yoshida. "Design study of molten-salt-type reactor for powering space probes and its automated start-up." Journal of Nuclear Science and Technology 50.10 (2013): 998-1010.*

(Continued)

Primary Examiner — Lily C Garner
(74) Attorney, Agent, or Firm — Oblon, McClelland, Maier & Neustadt, L.L.P.

(57) ABSTRACT

A thermal-neutron reactor core includes: a solid moderator expanding to a lengthwise direction; a fuel in the moderator, parallel to the lengthwise direction of the moderator, the fuel containing a fissile material; a cooling tube parallel to the lengthwise direction of the moderator; and a plurality of kinds of burnable poison included in the fuel. The may contain a metal hydride. Furthermore, the plurality of kinds of burnable poison may include one burnable poison containing a concentration of one particular isotope of that one burnable poison.

8 Claims, 14 Drawing Sheets

(51) Int. Cl.
G21C 7/04 (2006.01)
G21C 3/28 (2006.01)
G21C 3/07 (2006.01)
G21C 5/02 (2006.01)
G21C 5/12 (2006.01)
G21C 3/00 (2006.01)
G21C 11/06 (2006.01)

(52) U.S. Cl.
CPC .............. *G21C 5/02* (2013.01); *G21C 5/12* (2013.01); *G21C 7/04* (2013.01); *G21C 11/06* (2013.01); *Y02E 30/30* (2013.01)

(56) References Cited

U.S. PATENT DOCUMENTS

| | | | | |
|---|---|---|---|---|
| 3,274,068 A | * | 9/1966 | Koutz | G21C 3/04 |
| | | | | 376/423 |
| 3,334,997 A | * | 8/1967 | Vachet | C22C 25/00 |
| | | | | 420/401 |
| 3,361,857 A | * | 1/1968 | Rose | G21C 3/62 |
| | | | | 264/0.5 |
| 3,485,717 A | * | 12/1969 | Eich | G21C 7/113 |
| | | | | 376/333 |
| 5,349,618 A | | 9/1994 | Greenspan | |
| 5,408,510 A | * | 4/1995 | Ball | G21C 3/40 |
| | | | | 376/321 |
| 10,199,128 B2 | * | 2/2019 | Shayer | G21C 5/14 |
| 10,692,612 B2 | * | 6/2020 | Kimura | G21C 5/14 |
| 2012/0219102 A1 | | 8/2012 | Shayer | |
| 2013/0083878 A1 | | 4/2013 | Massie et al. | |
| 2015/0228363 A1 | * | 8/2015 | Dewan | G21C 3/06 |
| | | | | 376/458 |
| 2016/0217874 A1 | * | 7/2016 | Dewan | G21C 1/16 |
| 2018/0040385 A1 | * | 2/2018 | Hong | G21C 3/328 |
| 2018/0301230 A1 | * | 10/2018 | Pencer | G21C 3/322 |

FOREIGN PATENT DOCUMENTS

| | | |
|---|---|---|
| GB | 804902 A | 11/1958 |
| JP | 11-84043 A | 3/1999 |
| JP | 2005-24346 A | 1/2005 |
| JP | 2016-38260 A | 3/2016 |
| JP | 2016-118485 A | 6/2016 |
| JP | 2016118485 A * | 6/2016 |

OTHER PUBLICATIONS

Robert D. Rockwell, Jr., "Investigation of the Topaz-II Space Nuclear Reactor Moderator Thermal Transient," MIT, 1993, 31 Pages.
"Jendl—4.0", Nuclear Data Research Group, Japan Atomic Energy Agency, Feb. 2016, 6 Pages.
Ming Ding, Jan Leen Kloosterman. "Neutroonic feasibility design of a small long-life HTR." Nuclear Engineering and Design. Delft University of Technology, Mekelweg 15, 2629 JB Delft, the Netherlands. Aug. 2011.

* cited by examiner

THERMAL-NEUTRON REACTOR CORE AND DESIGN METHOD FOR THERMAL-NEUTRON REACTOR CORE

CROSS-REFERENCE TO RELATED APPLICATION

This application is based upon and claims the benefit of priority from Japanese Patent Application No. 2017-049738 filed on Mar. 15, 2017, the entire content of which is incorporated herein by reference.

FIELD

The embodiments of this invention relate to a thermal-neutron reactor core and a design method for a thermal-neutron reactor core.

BACKGROUND

Some very small, lightweight nuclear reactor systems use a metal hydride as a moderator. It has been demonstrated that the use of the hydride as the moderator could lead to positive temperature reactivity coefficient in the core due to a change in the neutron energy spectrum resulting from rising of core temperature. Such demonstration is disclosed in "Investigation of the TOPAZ-II space nuclear reactor moderator thermal transient", Robert D. Rockwell, MIT, 1993, the entire contents of which are incorporated herein by reference.

Meanwhile, the core of a nuclear reactor is generally required to have a negative temperature reactivity coefficient. If the core does not have the negative temperature reactivity coefficient, such operations as using control rods depending on the core temperature are needed. This means that the safety of the core is not sufficiently guaranteed.

As mentioned above, the problem with the core employing the metal hydride as the moderator is that the temperature reactivity coefficient is positive. Another problem is that, when gadolinium (Gd), which is a typical burnable poison, is used to suppress excess reactivity in the core, the temperature reactivity coefficient would become far more positive.

DETAILED DESCRIPTION

Embodiments of the present invention have been made to solve the above problems and an object thereof is to keep the temperature reactivity coefficient from being positive in a range between normal and high temperatures in a thermal-neutron reactor core.

According to an aspect of the present invention, there is provided a thermal-neutron reactor core comprising: a solid moderator expanding to a lengthwise direction; a fuel in the moderator, parallel to the lengthwise direction of the moderator, the fuel containing a fissile material; a cooling tube parallel to the lengthwise direction of the moderator; and a plurality of kinds of burnable poison included in the fuel.

According to an aspect of the present invention, there is provided a design method for a thermal-neutron reactor core including a solid moderator, the method comprising: deciding a specification of the thermal-neutron reactor core which includes a kind of a fuel, a size of the thermal-neutron reactor core, a composition of the moderator, and a cooling system; determining a neutron energy spectrum based on the specification; selecting a plurality of kinds of burnable poison; examining a temperature dependence of an effective neutron multiplication factor in the thermal-neutron reactor core based on a proportion of the plurality of kinds of burnable poison; deciding whether the proportion is acceptable for an operation of the thermal-neutron reactor core or is not acceptable based on the temperature dependence of the effective neutron multiplication factor, wherein the effective neutron multiplication factor should decrease as temperature rises for the operation.

Hereinafter, with reference to the accompanying drawings, a thermal-neutron reactor core and a design method for a thermal-neutron reactor core will be described. The same or similar portions are represented by the same reference symbols and will not be described repeatedly.

Figure 1:
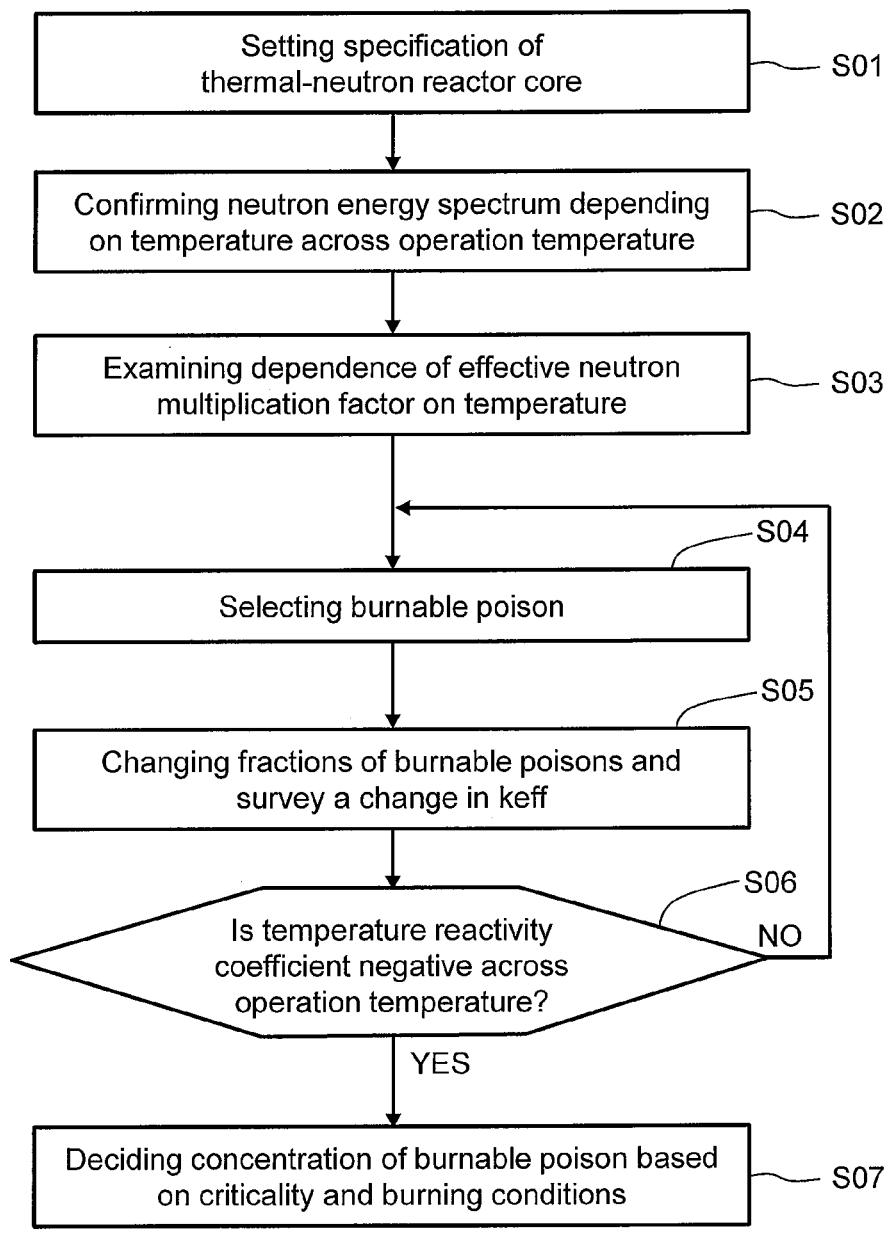
FIG. 1 is a flowchart showing the procedure of a design method for a thermal-neutron reactor core according to a present embodiment.

FIG. 1 is a flowchart showing the procedure of a design method for a thermal-neutron reactor core according to a present embodiment. What is shown here is the procedure of a design method of a thermal-neutron reactor core which includes burnable poison and in which an effective neutron multiplication factor monotonically decreases as operation temperature rises.

First, a specification of the thermal-neutron reactor core is set (Step S01). Specifically, major specification of the thermal-neutron reactor core such as the type of nuclear fuel and its form, the type of moderator and its form, the cooling method for the thermal-neutron reactor core, the size of key parts including the diameter and height of the core are set. At this step, the nuclear fuel is supposed not to contain any burnable poison.

Hereinafter, as the thermal-neutron reactor core, a small reactor core will be described as an example.

Figure 2:
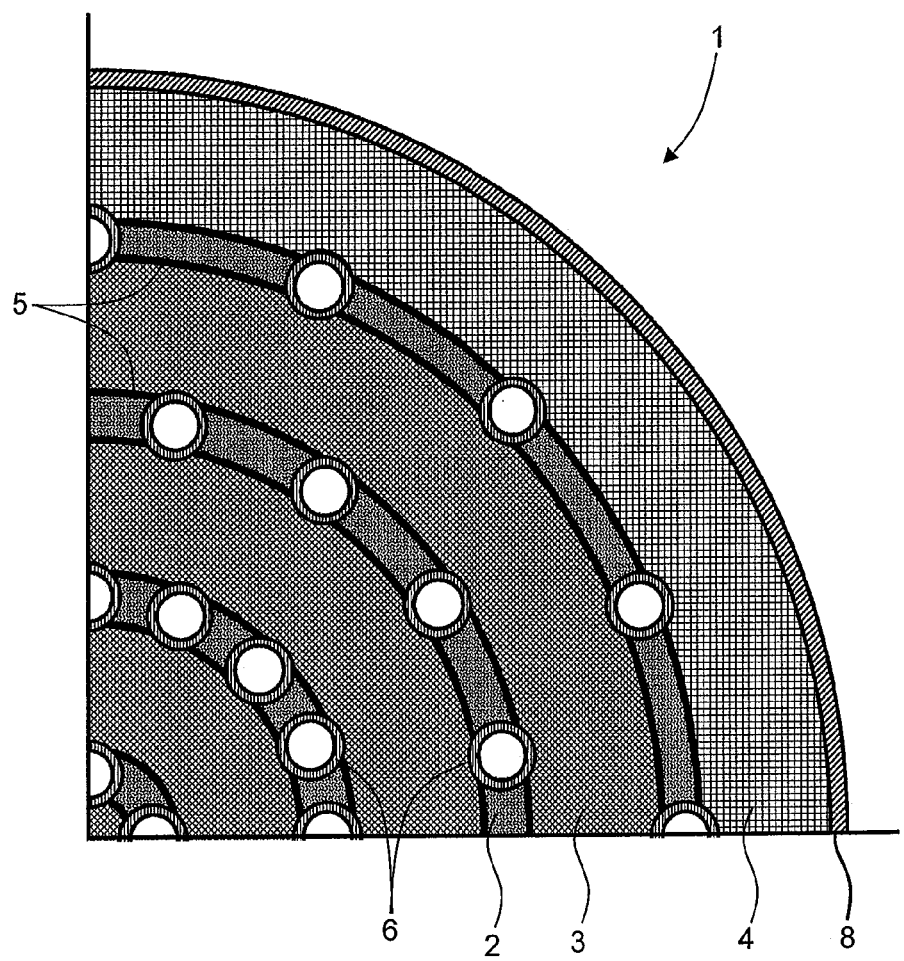
FIG. 2 is a cross-sectional view showing the configuration of one-fourth of the small reactor core according to the present embodiment.

FIG. 2 is a cross-sectional view showing the configuration of one-fourth of the small reactor core according to the present embodiment. The diagram shows circumferentially divided one-fourth sector of a small reactor core 1.

The small reactor core 1 is in the shape of a column as a whole and includes at least one fuel 2, at least one moderator 3, reflector 4, neutron multiplication materials 5 and at least one cooling tube 6. The small reactor core 1 may have one fuel 2, or one moderator 3, or one cooling tube 6. Although not shown in the diagram, the small reactor core 1 includes a device that has a reactivity control function. The reactivity control method here may be a method by which neutron absorbing materials are inserted or removed, a method that lets voids form or vanish in the core portion, a method by which the reflector is moved, or other method.

The small reactor core 1 is housed in a reactor vessel 8. A plurality of fuels 2 and a plurality of moderators 3 are disposed in layers radially and alternately. The moderator 3 at the radially center part has a columnar shape. The fuels 2 and the moderators 3 on the radially outer side of that portion have a cylindrical shape. The fuels 2 and the moderators 3 extend axially. In the radially outermost layer, the reflector 4 having a cylindrical shape is disposed.

In such a way as to be adjacent to the radially inner and outer surfaces of a region where the fuels 2 are disposed, neutron multiplication materials 5 having a cylindrical region are disposed.

In the layer of the fuels 2, the cooling tubes 6 are disposed with circumferential intervals therebetween. The cooling tubes 6 extend into the small reactor core 1 in such a way as to be parallel to the central axis of the small reactor core 1.

In the example shown in FIG. 2, the moderators 3 are placed at the center, and, on the radially outer side thereof, there are three layers of the fuels 2 and the moderators 3. However, the configuration is not limited to this. Instead, the fuels 2 may be disposed in the central portion. The radial thickness of the moderators 3 and the fuels 2, as well as the number of layers, shall be selected according to the design. The size and number of the cooling tubes 6 may be set according to the heat distribution and other factors.

The cooling tubes 6 are, for example, a heat absorbing portion of heat pipes. The tubes 6 may be pipes for coolant, such as water. A system in which such tubes pass through the core may be employed.

The fuels 2 at least include fissile materials such as uranium, thorium or transuranic elements. The example described below includes uranium as a fissile material. The form of the fuels 2 includes metallic component. However, it is not limited to that. For example, the form may be oxide, nitride or carbide. The fuels 2 have a metallic cladding (not shown) which surrounds the nuclear fuel material, in order to contain fission products resulting from the reaction of fissile materials.

The material of the moderators 3 is, for example, metal hydride and solid such as calcium hydride ($CaH_2$) or zirconium hydride ($ZrH_2$). According to the present embodiment, the material of the moderators 3 is $CaH_2$.

The neutron multiplication material 5 has the function of multiplying neutrons. Therefore, the neutron multiplication material 5 generates secondary neutrons from primary neutrons generated from the fuels 2 through nuclear reaction.

For the reflector 4 and the neutron multiplication material 5, material such as beryllium (Be) may be used. In the present embodiment, Be is used for the reflector 4 and the neutron multiplication material 5.

A reactor vessel 8 is hollow cylindrical and has a sealed structure, with both axial ends closed with closure parts (not shown). The cooling tubes 6 pass through one of the closure parts, or both.

One feature of metal hydride is that hydrogen dissociates at high temperature. Therefore, there is an upper limit of the operable temperatures at which hydrogen of metal hydride does not dissociate. Hereinafter, the operation temperature is supposed to be between normal temperatures, or about 300K, and about 1,000K.

The small reactor core 1 of the present embodiment has the above-described configuration, and the fuels 2 at least partially include a burnable poison. The factors such as type, concentration of the burnable poison are set as follows, based on the design method of the thermal-neutron reactor core of the present embodiment. Such a reactor core is the original small reactor core 1 of the present embodiment. However, hereinafter, even before the setting of burnable poison, those having the same configuration, excluding what the burnable poison is, will be also referred to as the small reactor core 1 of the present embodiment.

Then, based on the specification of the small reactor core 1 that is set at the core specification setting step, the neutron energy spectrum of the small reactor core 1 depending on the temperature across the range of the operation temperature is confirmed (Step S02).

Figure 3:
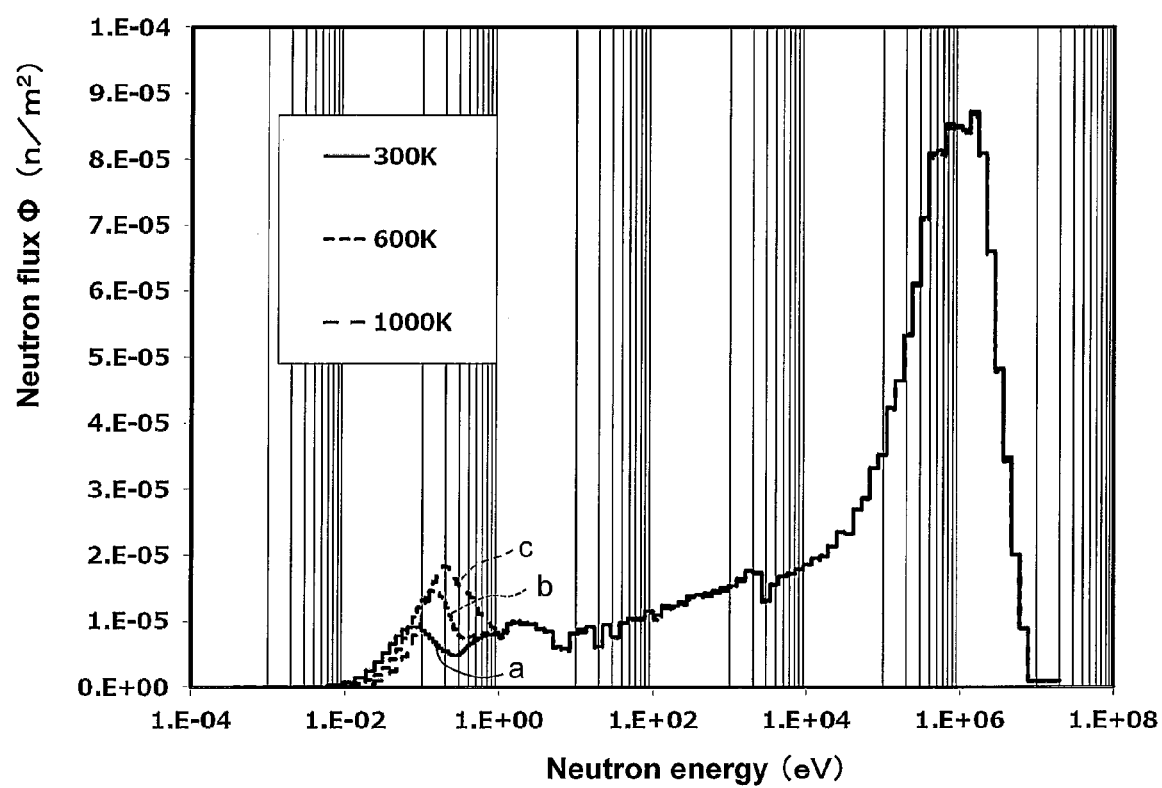
FIG. 3 is a graph showing the neutron energy spectrum of the small reactor core of the present embodiment.

FIG. 3 is a graph showing the neutron energy spectrum of the small reactor core of the present embodiment. The horizontal axis represents neutron energy (eV). The vertical axis shows neutron flux $\Phi$ ($n/m^2$) against each value of the neutron energy. The diagram shows three neutron energy spectra, depending on the operation temperature of the small reactor core 1. The solid curved line "a" shows the case that the temperature is 300K. The dotted curved line "b" shows the case that the temperature is 600K. The broken curved line "c" shows the case that the temperature is 1,000K.

The small reactor core 1 is a thermal-neutron reactor core having the moderators 3. Therefore, it is affected by the temperature of the small reactor core 1 in a thermal-neutron region that is thermally in equilibrium with the temperatures of the small reactor core 1. Meanwhile, in a region where the neutron energy is several electron volt (eV) or more, there is little change in the neutron energy spectrum with respect to changing temperature.

Specifically, in the thermal neutron energy region between about 0.01 eV and about 1 eV, there are differences in the neutron energy spectrum. In the region where the neutron energy is more than about 1 eV, there are almost no differences.

The neutron energy spectrum peaks at about 0.08 eV in the case of 300K, represented by the curved line "a"; at about 0.2 eV in the case of 600K, represented by the curved line "b"; and at about 0.3 eV in the case of 1,000K, represented by the curved line "c". That is, as the temperature of the small reactor core 1 goes up, the neutron energy spectrum shifts to the higher energy side in the thermal neutron energy region.

Then, the dependence of the effective neutron multiplication factor, keff, of the small reactor core 1 on the temperature of the small reactor core 1 is examined (Step S03). First, the cross sections of uranium 235 (U235), a fissile nuclide that constitutes the fuels 2, and of uranium 238 (U238), a parent substance, will be explained, before an example of calculation of the effective neutron multiplication factor, keff, of the small reactor core 1 is shown.

Figure 4:
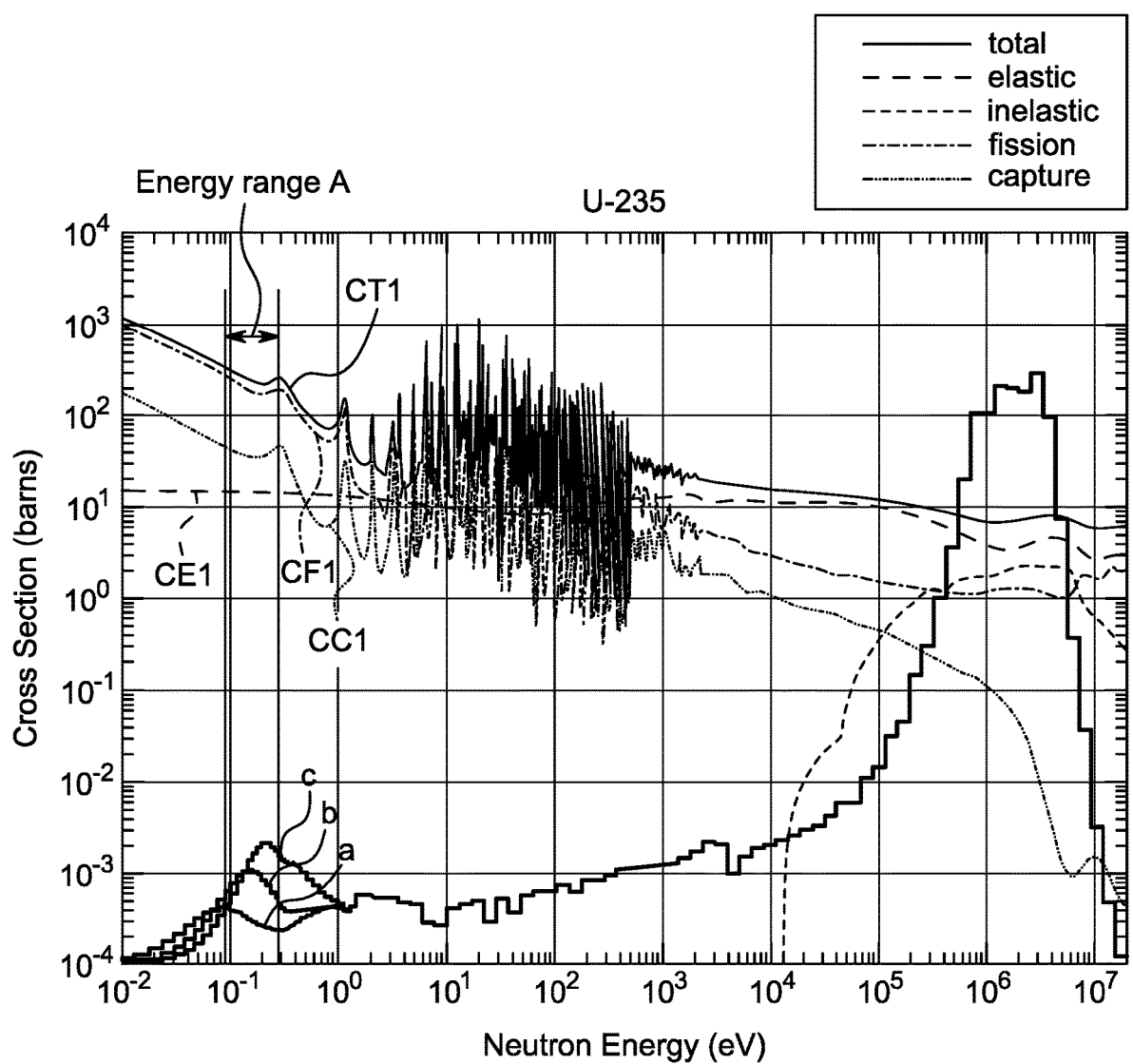
FIG. 4 is a graph showing the spectrum of the reaction cross section of uranium 235 in comparison with the neutron energy spectrum of the small reactor core.

FIG. 4 is a graph showing the shape of the spectrum of the reaction cross section of uranium 235 in comparison with the shape of the neutron energy spectrum of the small reactor core. The horizontal axis represents Neutron Energy, i.e., neutron energy (eV). As for the reaction cross section, the vertical axis represents Cross Section (barns). One barn, the unit of the cross section, is $10^{-24}$ cm$^2$ or $10^{-28}$ m$^2$. This diagram of cross section is excerpted from JENDL-4.0 Data, Nuclear Data Research Group, Japan Atomic Energy Agency, Feb. 2, 2016.

In FIG. 4, the solid curved line, CT1, represents the entire cross section. The one-dot chain curved line, CF1, represents cross section σf of fission reaction. The two-dot chain curved line, CC1, represents cross section σc of neutron capture reaction. The broken curved line, CE1, represents cross section σe of neutron elastic scattering. These are the same as in the diagrams shown below regarding each of the cross sections. The superimposed neutron energy spectrum is the same as in FIG. 3, and should be deemed relative values even though its vertical axis is not displayed.

When the temperature of the small reactor core rises from 300K to 600K, neutron flux Φ in a region represented as an energy range A significantly increases. Meanwhile, with respect to the increase in the neutron energy in energy range A, the degree of a change in fission cross section σf of U235 indicated by one-dot chain line is not significant compared to the degree of a change in neutron flux Φ with respect to the increase in neutron energy in energy range A. Therefore, fission response rate σf·Φ increases as a result.

Figure 5:
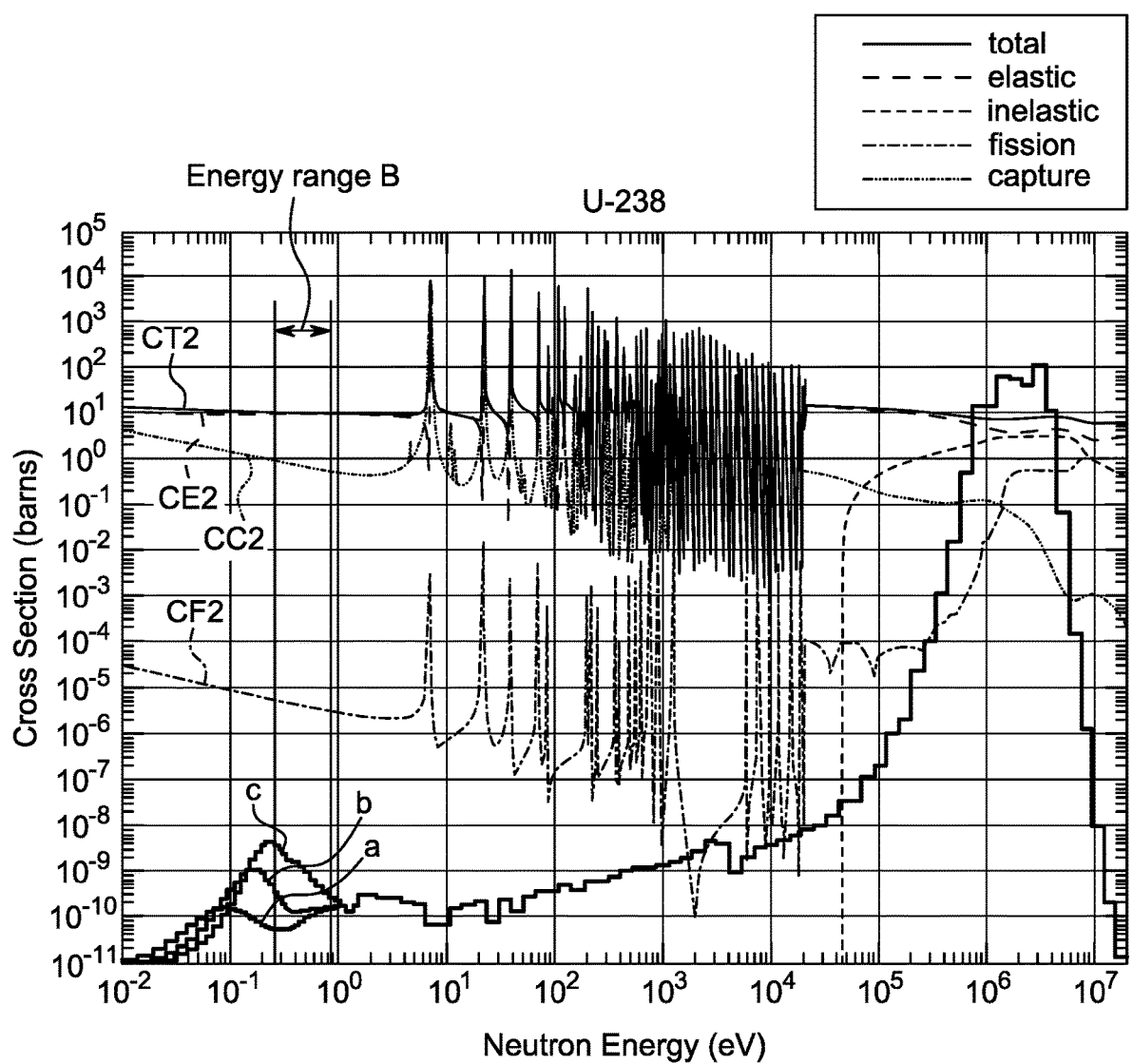
FIG. 5 is a graph showing the spectrum of the reaction cross section of uranium 238 in comparison with the neutron energy spectrum of the small reactor core.

FIG. 5 is a graph showing the spectrum of the reaction cross section of uranium 238 in comparison with the neutron energy spectrum of the small reactor core. The horizontal and vertical axes are the same as those in FIG. 4. In FIG. 5, the solid curved line, CT2, represents the entire cross section. The broken curved line, CE2, represents the cross section of elastic scattering. The two-dot chain curved line, CC2, represents cross section σc of neutron capture reaction. The one-dot chain curved line, CF2, represents cross section σf of fission reaction. This diagram of cross sections is excerpted from Non-Patent Document 2.

In a region greater than or equal to several dozens of eV, there are multiple peaks of large capture cross section σc. As the temperature of the small reactor core 1 rises, neutron flux Φ in an energy range B, as shown in FIG. 5, shifts to a higher energy side. Meanwhile, as the temperature of the small reactor core 1 rises, the peaks of capture cross section σc of uranium 238 spread due to Doppler effect, and the effective neutron multiplication factor keff of the small reactor core 1 is suppressed regardless of the change of spectrum in the energy range B.

Figure 6:
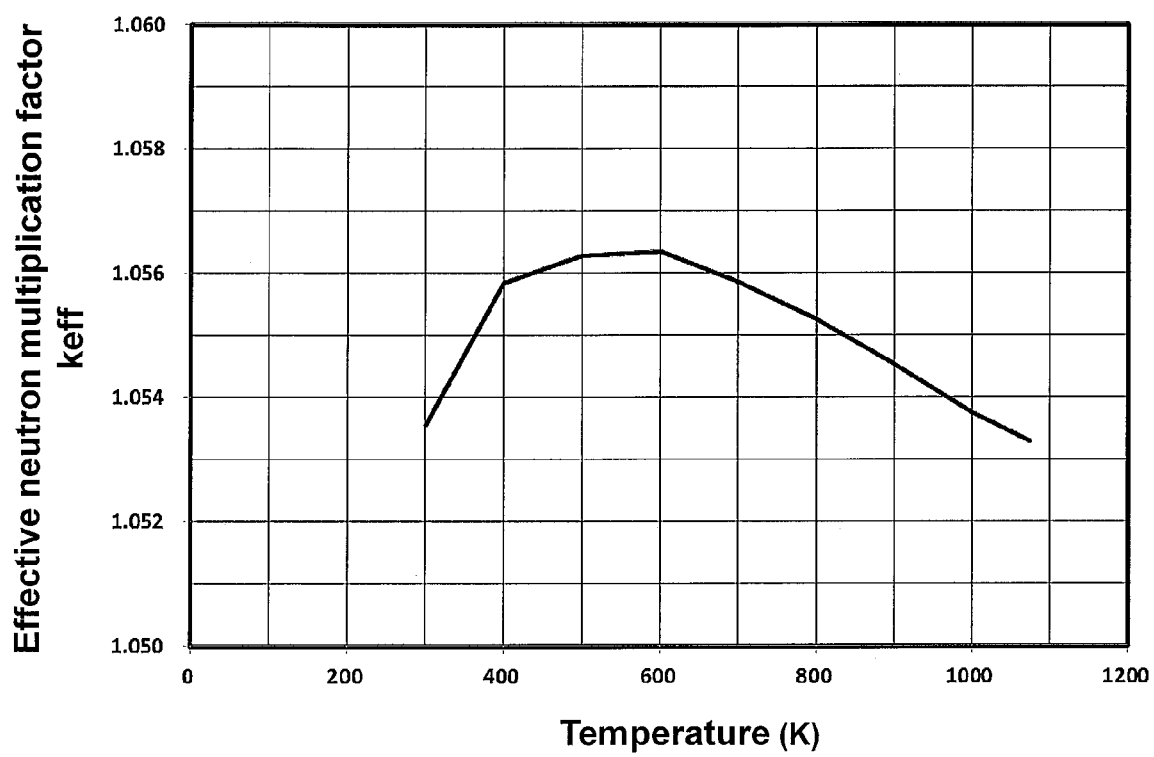
FIG. 6 is a graph showing the temperature dependence of the effective neutron multiplication factor when no burnable poison is added to the nuclear fuel of the small reactor core.

FIG. 6 is a graph showing the temperature dependence of the effective neutron multiplication factor when no burnable poison is added to the nuclear fuel of the small reactor core. The horizontal axis represents the temperature of the small reactor core 1. The vertical axis represents the effective neutron multiplication factor keff of the small reactor core 1.

The temperature reactivity coefficient of the small reactor core 1 is a differential value of reactivity ρ with respect to temperature T of the small reactor core 1. Reactivity ρ is calculated by the following equation (1), based on the effective neutron multiplication factor keff. Reactivity ρ is in one-on-one relationship with the effective neutron multiplication factor keff.

$$\rho=(keff-1)/keff \qquad (1)$$

Accordingly, with respect to temperature T of the small reactor core 1, when the differential value of the effective neutron multiplication factor keff is positive, the temperature reactivity coefficient is positive, and, when differential value of the effective neutron multiplication factor keff is negative, the temperature reactivity coefficient is negative. Thus, whether the temperature reactivity coefficient is positive or negative can be evaluated. Or, instead, as described below, the temperature dependence of the effective neutron multiplication factor keff of the small reactor core 1 may be used as a basis for evaluation.

As described above, in a region where the temperature of the small reactor core 1 is between about 300K and about 600K, fission reaction rate σf·Φ of U235 increases. Therefore, as the temperature of the small reactor core 1 rises, the effective neutron multiplication factor keff of the small reactor core 1 increases. Meanwhile, in a region where the temperature of the small reactor core 1 is between about 600K and about 1,000K, neutron flux Φ of energy range B increases. But due to the Doppler effect, contributions from neutron capture reaction rate σc·Φ by U238 increase.

As a result, with respect to the temperature of the small reactor core 1, the effective neutron multiplication factor keff would change in such a way as to have a peak at about 600K. Therefore, in the temperature region between about 300K and about 600K, the temperature reactivity coefficient is positive. In the region between about 600K and about 1,000K, the temperature reactivity coefficient is negative.

Then, based on a change in the neutron energy spectrum, a burnable poison is selected (Step S04). In this process, such factors are taken into account as whether a peak of the capture cross section in the thermal neutron region exists or not, and the trend of the changing capture cross section with respect to a change in neutron energy.

As for the burnable poison, the following cases will be sequentially explained: when gadolinium (Gd), an element conventionally used, is selected; when cadmium (Cd) is selected; when europium (Eu) is selected; and when a combination of Cd and Eu is selected.

Figure 7:
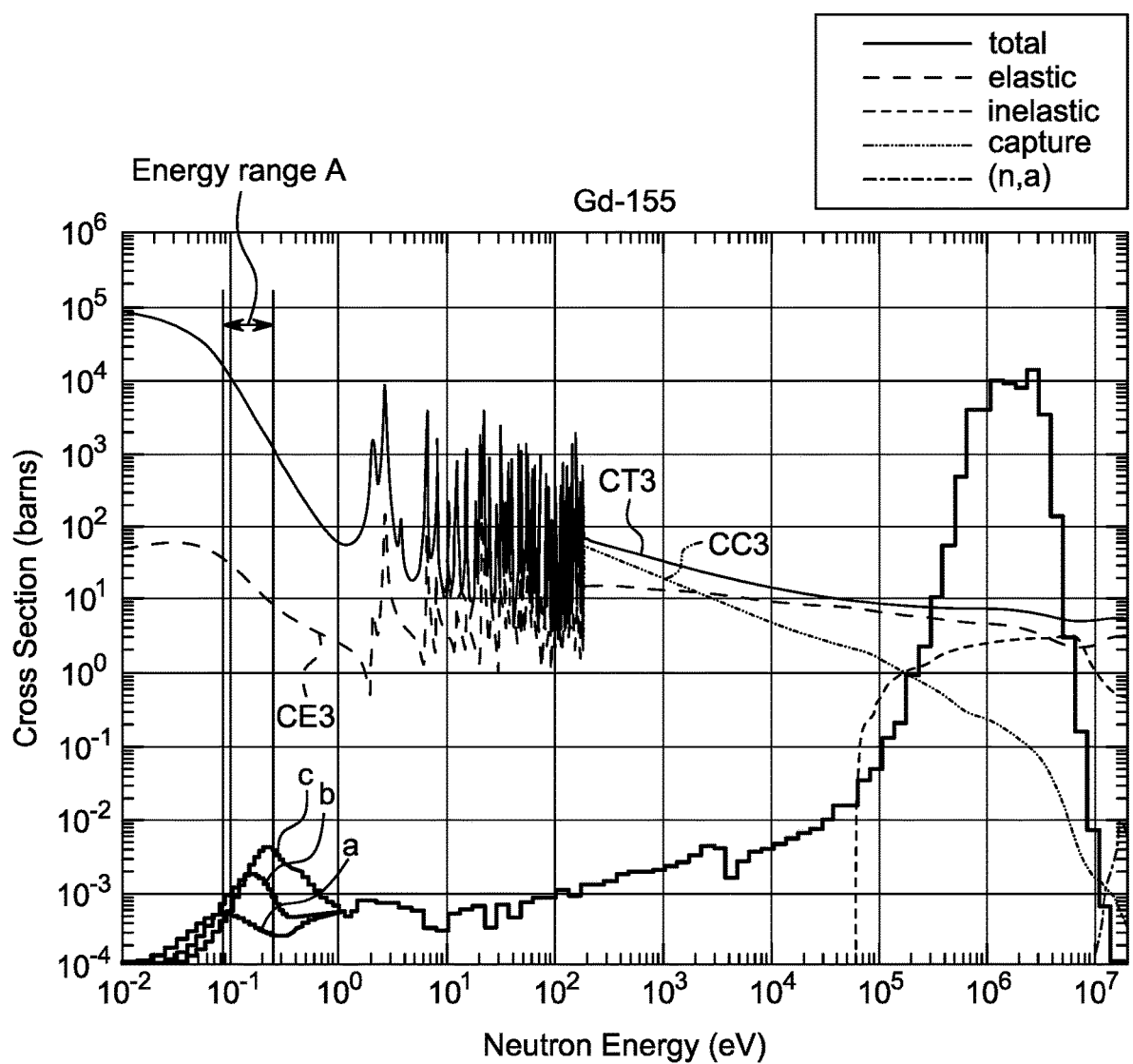
FIG. 7 is a graph showing the spectrum of the reaction cross section of gadolinium 155 in comparison with the neutron energy spectrum of the small reactor core.

FIG. 7 is a graph showing the shape of the spectrum of the reaction cross section of gadolinium 155 in comparison with the shape of the neutron energy spectrum of the small reactor core. The horizontal axis and the vertical axis are the same as those in FIGS. 4 and 5. In FIG. 7, the solid curved line, CT3, represents the entire cross section. The two-dot chain curved line, CC3, represents cross section σc of neutron capture reaction. The dotted curved line, CE3, represents cross section σe of elastic scattering. This diagram of cross sections is excerpted from Non-Patent Document 2.

As shown in FIG. 7, in response to an increase in neutron energy in the energy range A, neutron capture cross section σc of Gd155 monotonically and significantly decreases. As the temperature of the small reactor core rises from 300K to 600K and to 1,000K, neutron flux Φ in the energy range A shifts to the higher energy side.

As a result, as the temperature of the small reactor core 1 rises, capture reaction rate σc·Φ of Gd155, a minus-side factor of the effective neutron multiplication factor keff of the small reactor core 1, decreases.

Figure 8:
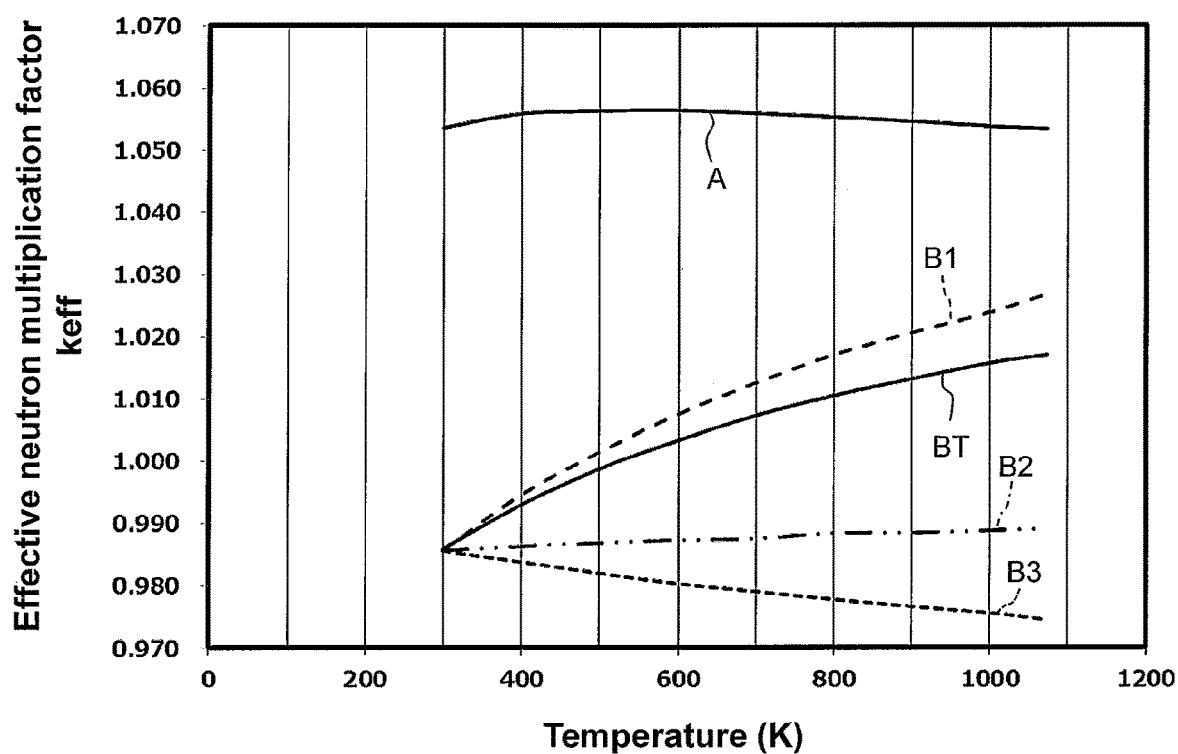
FIG. 8 is a graph showing the temperature dependence of the effective neutron multiplication factor when gadolinium is added as burnable poison to the nuclear fuel of the small reactor core.

FIG. 8 is a graph showing the temperature dependence of the effective neutron multiplication factor when gadolinium is added as burnable poison to the nuclear fuel of the small reactor core. The horizontal axis represents temperature (K) of the small reactor core 1. The vertical axis represents the effective neutron multiplication factor keff of the small reactor core 1.

Solid curved line A represents the temperature dependence of the effective neutron multiplication factor keff when no burnable poison is added to nuclear fuel, and is the same as the one shown in FIG. 6.

Solid curved line BT shows the temperature dependence of the effective neutron multiplication factor keff when burnable poison is added to the nuclear fuel of the small reactor core 1. If gadolinium (Gd) is added as burnable poison to the nuclear fuel, the effective neutron multiplication factor keff monotonically increases in response to a rise in temperature between 300K and 1,100K. This means that the temperature reactivity coefficient is positive. Moreover, the slope of the increase in the effective neutron multiplication factor keff is greater than the slope of the increase in the effective neutron multiplication factor keff in a range of 300K to about 400K with no gadolinium (Gd) added.

The value of the effective neutron multiplication factor keff when Gd is added to the nuclear fuel in the case of FIG. 8 is a result of taking into account a decrease of the effective neutron multiplication factor keff resulting from the added burnable poison on the basis of the effective neutron multiplication factor keff of the case when no burnable poison is added to the nuclear fuel. That is, since it is sufficient in confirming the trend of changes in the effective neutron multiplication factor keff that occur with changing temperature, no adjustments have been made again to the effective neutron multiplication factor keff based on core criticality conditions.

In order to clarify factors behind the positive temperature reactivity, coefficient, each factor has been evaluated by looking into how the effective neutron multiplication factor keff would change with changing temperature. Broken curved line B1 shows a change in temperature with only moderator or metal hydride. In this case, as the temperature rises, the effective neutron multiplication factor keff increases. Two-dot chain curved line B2 shows a change in temperature with only multiplication material and reflector. In this case, the effective neutron multiplication factor keff remains almost constant even as the temperature changes. Dotted curved line B3 shows a change in temperature with only fuel or uranium. In this case, as the temperature rises, the effective neutron multiplication factor keff decreases. Accordingly, it is clear that an increase in the effective neutron multiplication factor keff that is associated with an rise in the temperature of the moderator, as indicated by broken line B1, is a factor that makes the temperature reactivity coefficient positive when Gd is added as burnable poison to nuclear fuel.

This is because: as shown in FIG. 7, in response to an increase in neutron energy in energy range A in FIG. 7, neutron capture cross section σc of Gd155 monotonically and significantly decreases; and, as a result, neutron capture reaction rate σc·Φ, which contributes to shifting the effective neutron multiplication factor keff to the negative side, decreases.

Figure 9:
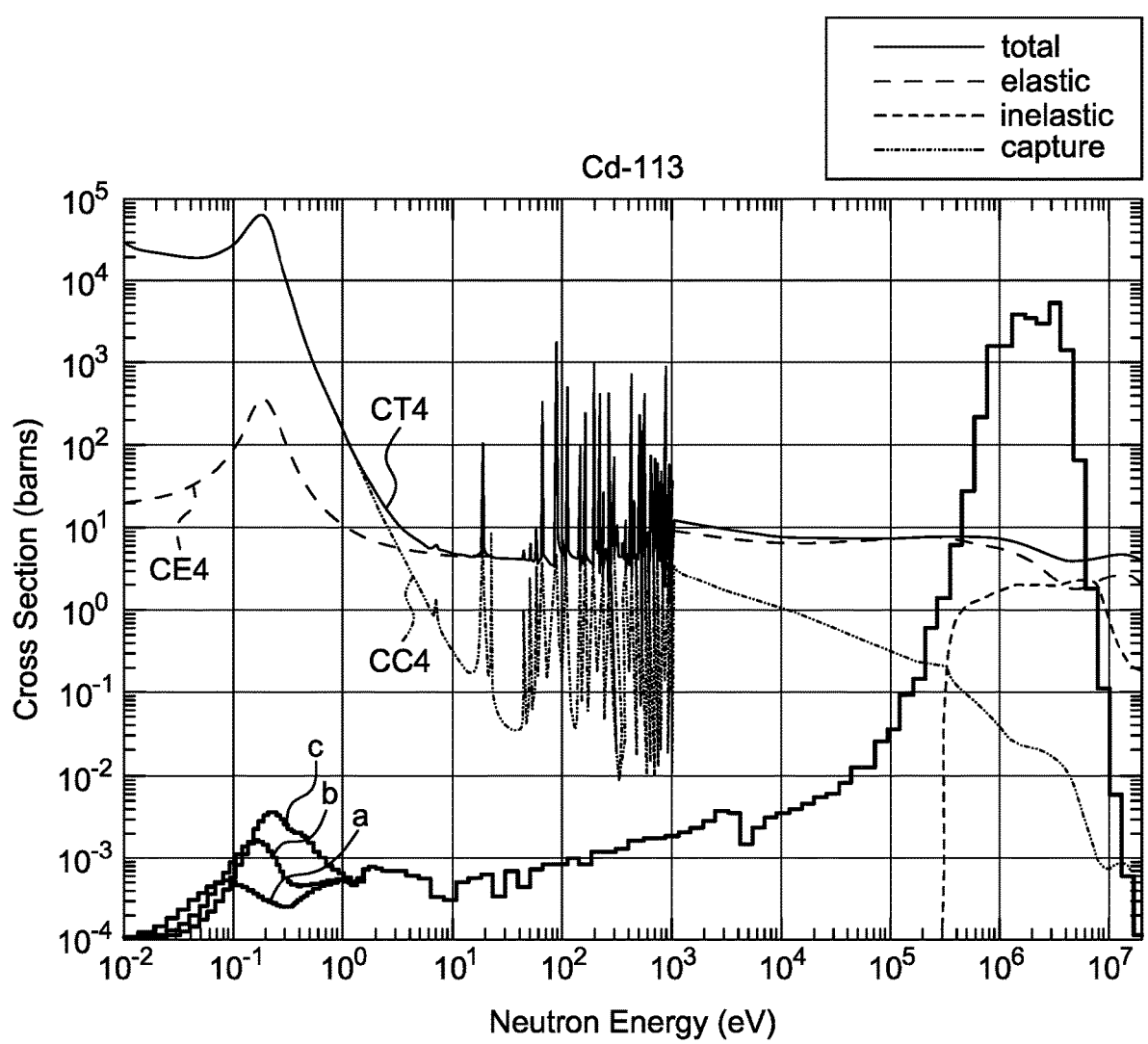
FIG. 9 is a graph showing the spectrum of reaction cross section of cadmium 113 in comparison with the neutron energy spectrum of the small reactor core.

FIG. 9 is a graph showing the spectrum of reaction cross section of cadmium 113 in comparison with the neutron energy spectrum of the small reactor core. The horizontal and vertical axes are the same as in FIG. 7. In FIG. 9, the solid curved line, CT4, represents the entire cross section. The two-dot chain curved line, CC4, represents cross section σc of neutron capture reaction. The dotted curved line, CE4, represents cross section σe of elastic scattering. This diagram of cross sections is excerpted from Non-Patent Document 2.

As for Cd 113, isotopically enriched products are available. As shown in FIG. 9, in the case of Cd 113, neutron capture cross section σc peaks at about 0.2 eV in the thermal-neutron energy region. Therefore, in the thermal-neutron region, until neutron energy reaches about 0.2 eV, neutron capture cross section σc increases in response to a rise in neutron energy. In the energy region over about 0.2 eV, neutron capture cross section σc decreases in response to a rise in neutron energy.

As for the state of the thermal-neutron region of the neutron energy spectrum for a change in the temperature of the small reactor core, as described above along with FIG. 3, there is a peak near 0.08 eV when the temperature of the small reactor core is 300K; there is a peak near 0.2 eV when the temperature is 600K.

As the temperature of the small reactor core changes from 300K to 600K, neutron capture cross section σc of Cd113 increases. However, when the temperature of the small reactor core changes from 600K to 1,000K, neutron capture cross section σc of Cd 113 decreases. As a result, as the temperature of the small reactor core changes from 300K to 600K and then to 1,000K, neutron capture reaction rate σc·Φ, which causes a drop in the effective neutron multiplication factor keff, increases and then decreases.

Figure 10:
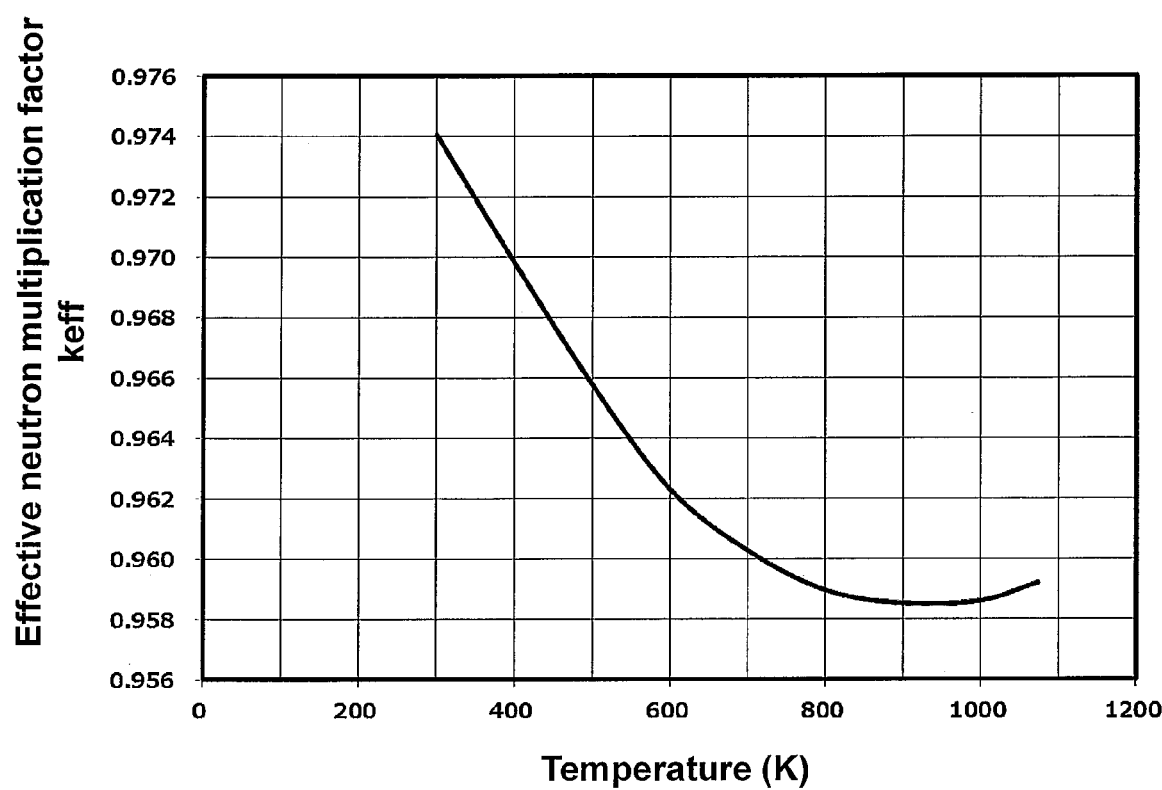
FIG. 10 is a graph showing the temperature dependence of the effective neutron multiplication factor when concentrated cadmium 113 is used as burnable poison for nuclear fuel of the small reactor core.

FIG. 10 is a graph showing the temperature dependence of the effective neutron multiplication factor when concentrated cadmium 113 is used as burnable poison for nuclear fuel of the small reactor core. The horizontal axis represents temperature (K) of the small reactor core. The vertical axis represents the effective neutron multiplication factor keff of the small reactor core.

As described above, as the temperature of the small reactor core changes from 300K to 600K and then to 1,000K, neutron capture reaction rate σc·Φ of Cd113, which causes a drop in the effective neutron multiplication factor keff, increases and then decreases. As a result, the effective neutron multiplication factor keff of the small reactor core changes in an opposite way as shown in FIG. 10, so that the effective neutron multiplication factor keff first decreases and then increases. In this case, there is a need to correct the situation where the temperature reactivity turns positive in a region close to a state where the temperature of the small reactor core is 1,000K.

Figure 11:
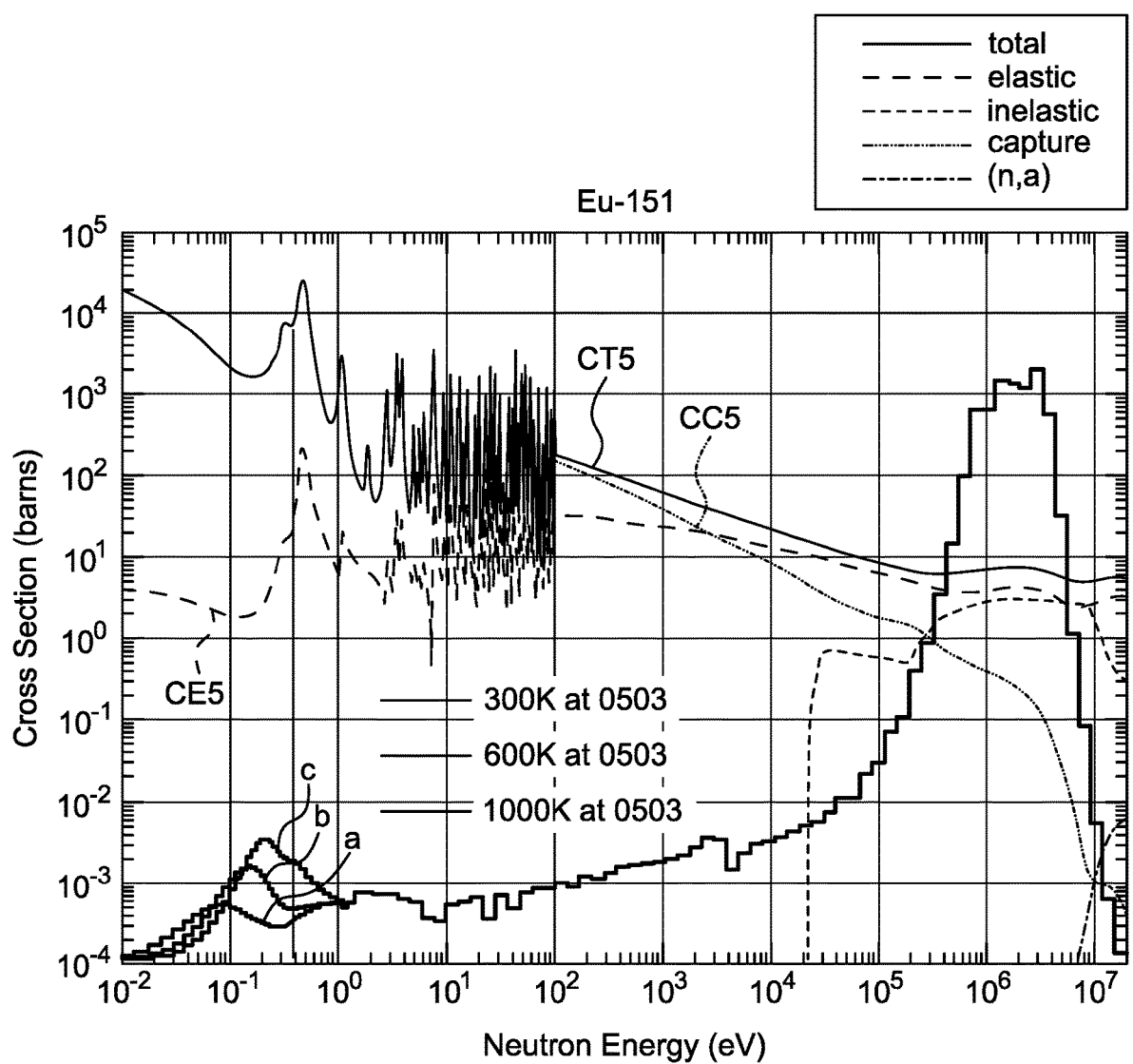
FIG. 11 is a graph showing the spectrum of reaction cross section of europium 151 in comparison with the neutron energy spectrum of the small reactor core.

FIG. 11 is a graph showing the shape of spectrum of reaction cross section of europium 151 in comparison with the shape of the neutron energy spectrum of the small reactor core. In FIG. 11, the solid curved line, CT5, represents the entire cross section. The two-dot chain curved line, CC5, represents cross section σc of neutron capture reaction. The dotted curved line, CE5, represents cross section σe of elastic scattering. This diagram of cross sections is excerpted from Non-Patent Document 2.

As for Eu, isotopically enriched products are available. As shown in FIG. 11, in the case of Eu 151, there is a resonance absorption peak of neutron capture cross section σc at about 0.4 eV of energy. From about 0.2 eV to about 0.3 eV, neutron capture cross section σc increases.

Figure 12:
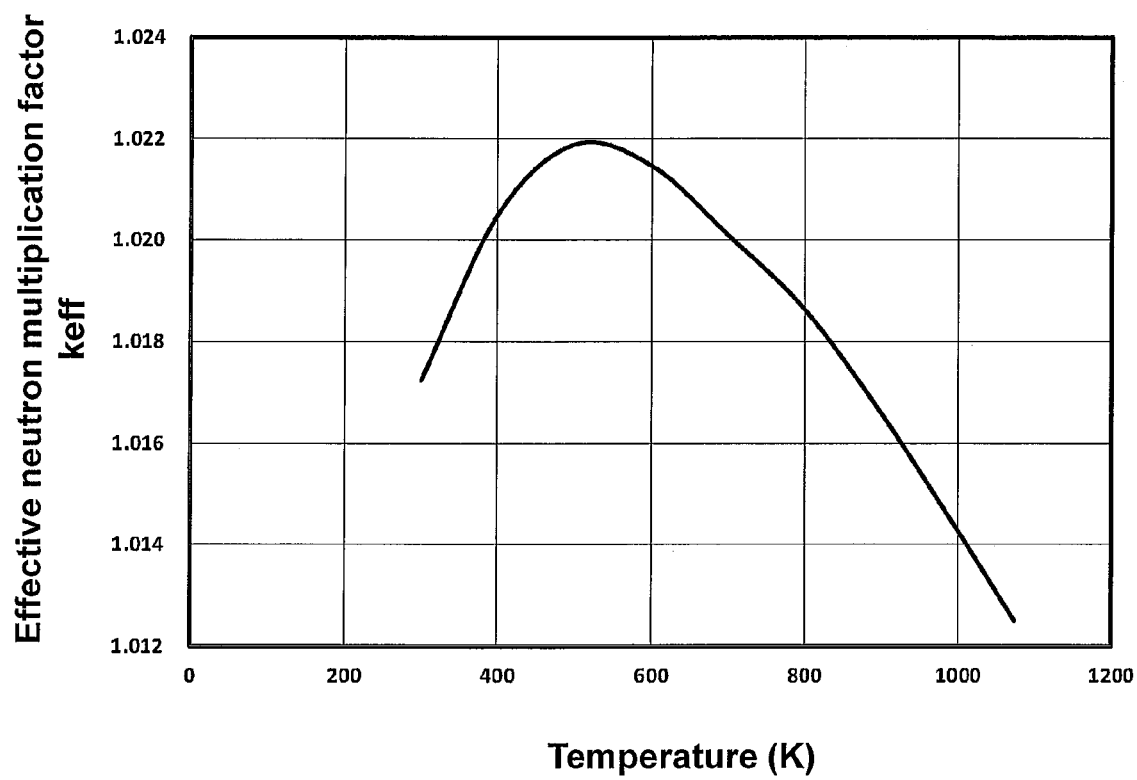
FIG. 12 is a graph showing the temperature dependence of the effective neutron multiplication factor when concentrated europium 151 is used as burnable poison for nuclear fuel of the small reactor core.

FIG. 12 is a graph showing the temperature dependence of the effective neutron multiplication factor when concentrated europium 151 is used as burnable poison for nuclear fuel of the small reactor core. The horizontal axis represents the temperature of the small reactor core 1. The vertical axis represents the effective neutron multiplication factor keff of the small reactor core 1.

As shown in FIG. 12, in a temperature region less than about 500K, the effective neutron multiplication factor keff increases as the temperature rises, which means the temperature reactivity coefficient is positive. In a temperature region greater than or equal to about 500K, the effective neutron multiplication factor keff decreases in response to a rise in temperature. This means that the temperature reactivity coefficient is negative.

As described above, when a minute amount of Cd 113 is added, the temperature reactivity coefficient is negative in the low-temperature region. When a minute amount of Eu 151 is added, the temperature reactivity coefficient is negative in the high-temperature region.

Figure 13:
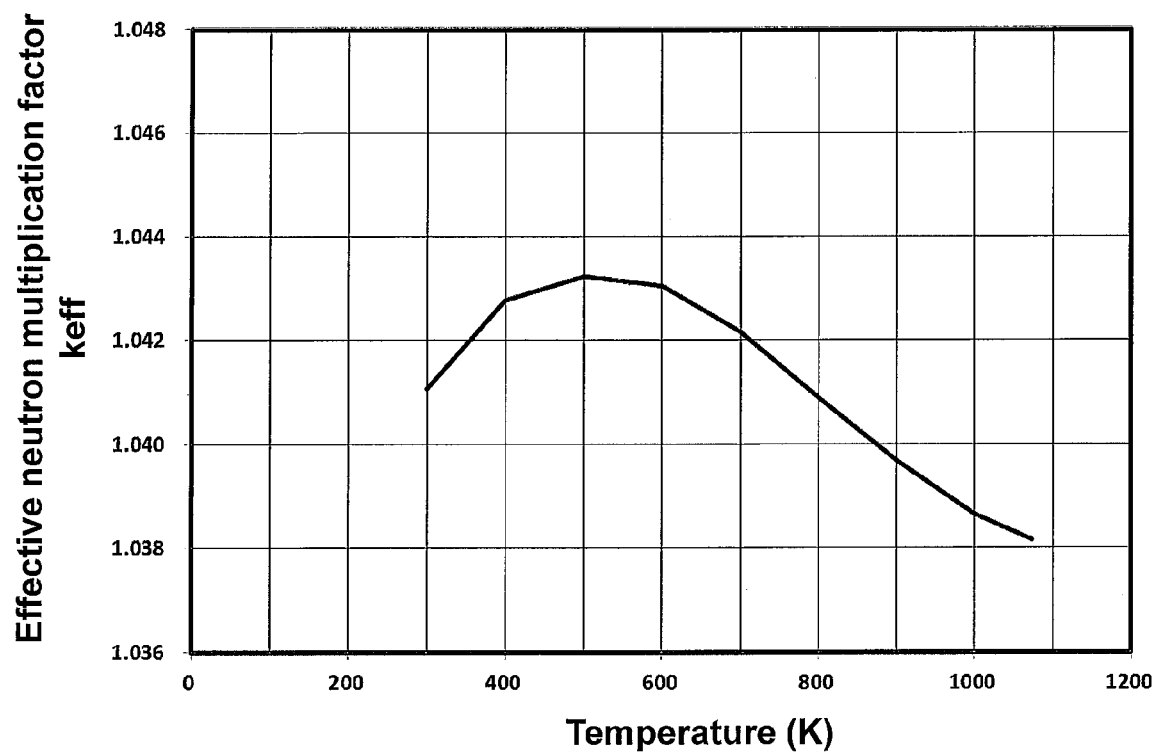
FIG. 13 is a graph showing the temperature dependence of the effective neutron multiplication factor when cadmium and europium with natural compositions are used as burnable poison for nuclear fuel of a small reactor core, for comparison with the present embodiment.

FIG. 13 is a graph showing the temperature dependence of the effective neutron multiplication factor when cadmium and europium with natural compositions are used as burnable poison for nuclear fuel of a small reactor core, for comparison with the present embodiment.

The natural isotopic composition of cadmium is approximately: 28.7 percent of Cd 114, 24.1 percent of Cd 112, 12.8 percent of Cd 111, 12.5 percent of Cd 110, 12.2 percent of Cd 113, 7.5 percent of Cd 116, 1.3 percent of Cd 106 and 0.9 percent of Cd 108.

The natural isotopic composition of europium is approximately: 52.2 percent of Eu 153 and 47.8 percent of Eu 151.

When cadmium and europium each with natural isotopic composition are used, the effective neutron multiplication factor keff of the small reactor core 1 increases in response to a rise in temperature, as long as the temperature of the small reactor core 1 is between about 300K and about 500K. When the temperature of the small reactor core 1 is between about 500K and about 1,000K, the effective neutron multiplication factor keff of the small reactor core 1 decreases in response to the rise in temperature.

That is, the temperature reactivity coefficient is positive when the temperature of the small reactor core 1 is between about 300K and about 500K. The temperature reactivity coefficient is negative when the temperature is between about 500K and 1,000K.

The next step in the design method of the thermal-neutron reactor core is to change the fractions of the selected burnable poisons and survey a change in the effective neutron multiplication factor keff of the thermal-neutron reactor core (Step S05). Then, a determination is made as to whether there is an acceptable case where the temperature reactivity coefficient is negative across the operation temperature region (Step S06).

A combination described below of cadmium 113 and europium 151 is acceptable.

Figure 14:
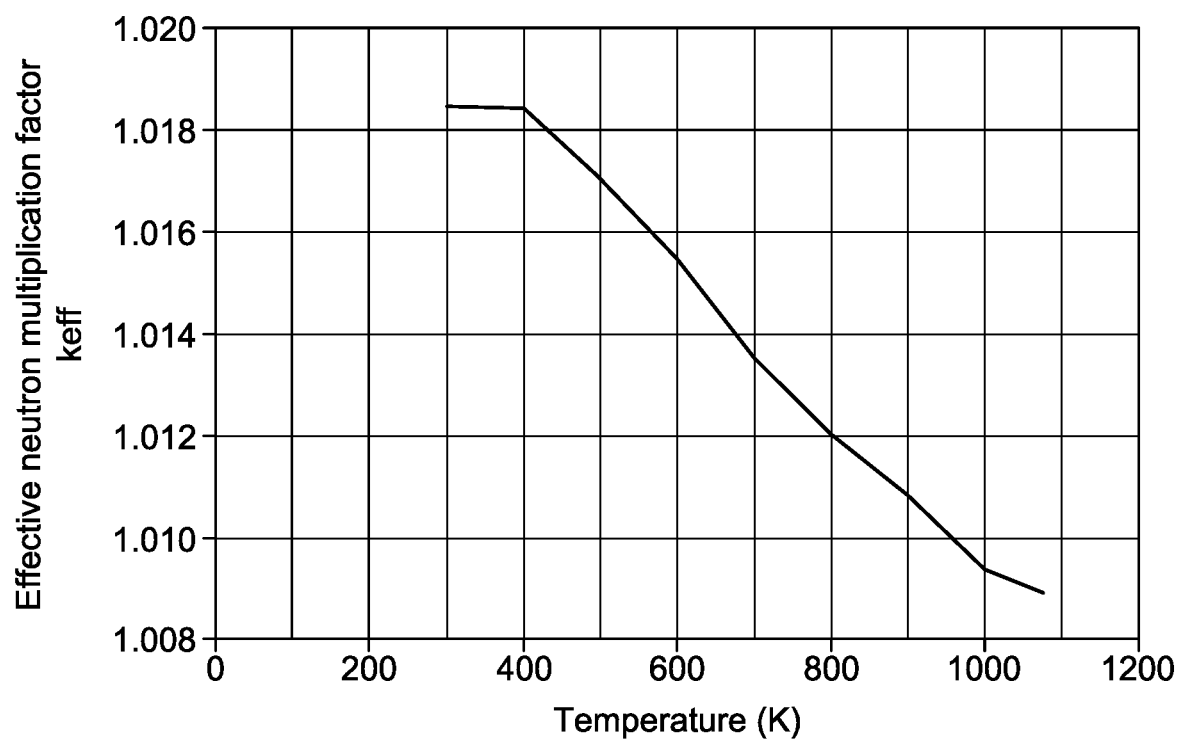
FIG. 14 is a graph showing the temperature dependence of the effective neutron multiplication factor when cadmium 113 and europium 151 are used as burnable poison for nuclear fuel of the small reactor core.

FIG. 14 is a graph showing the temperature dependence of the effective neutron multiplication factor keff when cadmium 113 and europium 151 are used as burnable poison for nuclear fuel of the small reactor core.

The diagram shows the temperature dependence of the effective neutron multiplication factor keff when a predetermined amount of concentrated Cd and a predetermined amount of concentrated Eu are added to nuclear fuel. The predetermined amount of concentrated Cd means that: the degree of concentration of Cd 113 is 96 percent, and the number-density ratio of Cd to nuclear fuel is 0.0072 percent. The predetermined amount of concentrated Eu is: the degree of concentration of Eu 151 is 96 percent, and the number-density ratio of Eu to nuclear fuel is 0.02 percent.

As shown in FIG. 14, when the temperature of the small reactor core rises from 300K to 400K, the effective neutron multiplication factor keff slightly decreases. Accordingly, the temperature reactivity coefficient is negative although the absolute value thereof is small. As the temperature of the small reactor core rises to as high as 1,000 k from 400K, the effective neutron multiplication factor keff remarkably decreases. In this case, the temperature reactivity coefficient is negative.

In this manner, minute amounts of two types of isotopes, Cd 133 and Eu 151, are added to nuclear fuel, and the temperature reactivity coefficient of the small reactor core is therefore negative at between 300K and 1,000K.

If the determination result indicates an acceptable case (Step S06, YES), a decision on the concentration of burnable poison in the acceptable case is made based on criticality and burning conditions (Step S07). The following is a result of adjustments intended to satisfy the criticality and burning conditions: the degree of concentration of Cd 113 in total Cd is 96 percent, and the number-density ratio of Cd to nuclear fuel is 0.0072 percent; and the degree of concentration of Eu 151 in total Eu is 96 percent, and the number-density ratio of Eu to nuclear fuel is 0.02 percent. The effective neutron multiplication factor keff on the vertical axis of FIG. 14, too, is a result of these adjustments.

If the determination result indicates no acceptable case (Step S06, NO), a series of steps from the selection of burnable poison to the determination is carried out again.

As described above, according to the present embodiment, as for the thermal-neutron reactor, the temperature reactivity coefficient can be prevented from becoming positive in a range from normal to high temperature.

OTHER EMBODIMENTS

While the embodiment of the present invention has been described, this embodiment is presented by way of example and not intended to limit the scope of the invention.

According to the embodiment, a plurality of fuels 2 and a plurality of moderators 3 are disposed in layers radially and alternately. However, the present invention is not limited to that. The groups of fuels 2 and moderators 3 each of which surrounds each of fuels 2 may be located in a lattice manner.

According to the embodiment, cadmium 113 and europium 151 are used as burnable poison. However, the present invention is not limited to them. Other various combinations of isotopes having a neutron absorption effect can produce similar results to those described in the embodiment, as long as their neutron capture cross sections decrease in response to a rise in temperature within the operation temperature range.

According to the embodiment, the present invention is applied to a small thermal-neutron reactor that uses metal hydride as moderator, because it is especially effective. However, the present invention is not limited to this. That is, even when other moderators are used, as long as it is a thermal-neutron reactor having moderator, a similar method to the one described in the embodiment is applied.

According to the embodiment, the nuclear fuel is uranium. However, the present invention is not limited to this. The present invention may be applied to mixed oxide fuel, which is made of uranium and plutonium, for example.

Furthermore, the above-described embodiments may be put to use in various different ways and, if appropriate, any of the components thereof may be omitted, replaced or altered in various different ways without departing from the spirit and scope of the invention. All the above-described embodiments and the modifications made to them are within the spirit and scope of the present invention, which is specifically defined by the appended claims, as well as their equivalents.

What is claimed is:

1. A thermal-neutron reactor core comprising:
a moderator extending to a lengthwise direction and formed in multiple concentric layers;
a fuel in the moderator, parallel to the lengthwise direction of the moderator, the fuel containing a fissile material, a burnable poison, and formed in multiple concentric layers;
a plurality of cooling tubes parallel to the lengthwise direction of the moderator, wherein
the multiple concentric layers of the moderator and the multiple concentric layers of the fuel alternate with each other, and
the plurality of cooling tubes are evenly distributed with circumferential intervals therebetween in at least one of the multiple concentric layers of the fuel.

2. The thermal-neutron reactor core according to claim 1, wherein the moderator contains a metal hydride.

3. The thermal-neutron reactor core according to claim 1, wherein the burnable poison is a burnable poison containing a concentration of one particular isotope of the burnable poison.

4. The thermal-neutron reactor core according to claim 1, wherein the burnable poison is cadmium-113 or europium-151.

5. The thermal-neutron reactor core according to claim 1, further comprising; a neutron multiplication material between the fuel and the moderator.

6. A design method for the thermal-neutron reactor core of claim 1 including a solid moderator, the method comprising:
deciding a specification of the thermal-neutron reactor core which includes a kind of a fuel, a size of the thermal-neutron reactor core, a composition of the moderator, and a cooling system;
determining a neutron energy spectrum based on the specification;
selecting a plurality of kinds of burnable poison;
examining a temperature dependence of an effective neutron multiplication factor in the thermal-neutron reactor core based on a proportion of the plurality of kinds of burnable poison; and
deciding whether the proportion is acceptable for an operation of the thermal-neutron reactor core or is not acceptable based on the temperature dependence of the effective neutron multiplication factor, wherein the effective neutron multiplication factor should decrease as temperature rises for the operation.

7. The design method for the thermal-neutron reactor core according to claim 6, further comprising:
deciding a ratio of the plurality of kinds of burnable poison to the fuel if the proportion is proper for the operation of the thermal-neutron reactor core.

8. The design method for the thermal-neutron reactor core according to claim 6, wherein the plurality of kinds of the burnable poison include cadmium-113 and europium-151.

* * * * *